Oct. 1, 1968  L. C. MEYNELL  3,403,700

FLUID MIXING VALVE WITH ADJUSTABLE CAM ACTUATOR

Filed May 9, 1966  2 Sheets-Sheet 1

Lionel C. Meynell
by Kenway, Jenney & Hildreth
att'ys.

Oct. 1, 1968  L. C. MEYNELL  3,403,700
FLUID MIXING VALVE WITH ADJUSTABLE CAM ACTUATOR
Filed May 9, 1966  2 Sheets-Sheet 2

Lionel C. Meynell
Kenway, Jenney & Hildreth
att'ys.

United States Patent Office 3,403,700
Patented Oct. 1, 1968

3,403,700
FLUID MIXING VALVE WITH ADJUSTABLE CAM ACTUATOR
Lionel Charles Meynell, Wolverhampton, England, assignor to Meynell & Sons Limited, Wolverhampton, England, a corporation of the United Kingdom of Great Britain and Northern Ireland
Filed May 9, 1966, Ser. No. 548,551
5 Claims. (Cl. 137—636.1)

This invention has reference to fluid mixing valves and is concerned more particularly but not specifically with fluid mixing valves for supplying water at a controlled temperature to shower fittings, baths, and to fittings for ablutionary purposes generally, the present invention having for its primary object to provide a fluid mixing valve for the said purposes which is simple in construction, efficient in operation and which preferably includes means for limiting the maximum temperature at which water can be dispensed to fittings as aforesaid.

Accordingly the invention consists of a fluid mixing valve incorporating a main housing provided with an inlet for the hot fluid and with an oppositely disposed inlet for the cold fluid and with outlet means for the mixed fluids, separately formed valve housings which are removably mounted in said main housing, valve means for controlling the flow from said inlets, means for ensuring an axial guided movement of the valve means relatively to their respective valve housing, tappets for actuating said valve means and a turnable single profile cam adapted when turned to co-act with said tappets for effecting the progressive opening and closing of the inlet control valve means so that there shall be a proportionate mixing of hot and cold fluids as the cam is turned, means for turning the cam for achieving the said purpose and means for retaining the valve housings within the main housing which make sure that the housings are correctly positioned and retained within the main housing and thereby to ensure that the tappets for actuating the guided valve means will always be presented to the periphery of the cam.

The invention also resides in the provision in conjunction with the actuating means aforesaid of a stop means for limiting the maximum temperature at which fluid may be dispensed.

The invention further resides in a fluid mixing valve constructed, arranged and adapted for use substantially as will be described hereinafter.

An embodiment of the invention will now be described with particular reference to the accompanying drawings which illustrate the invention as applied to a mixing valve which is particularly suited for supplying water at a desired temperature to a shower fitting.

Figure 1:
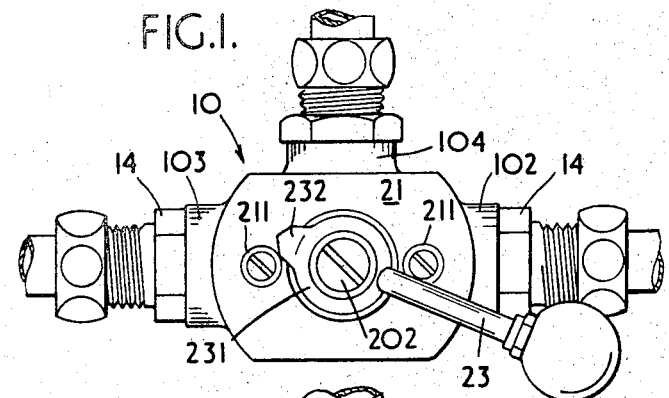
Figure 2:
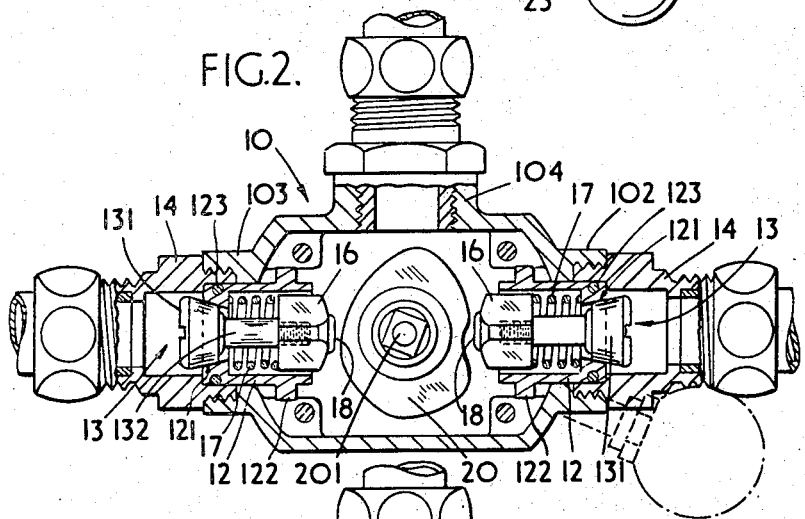
Figure 3:
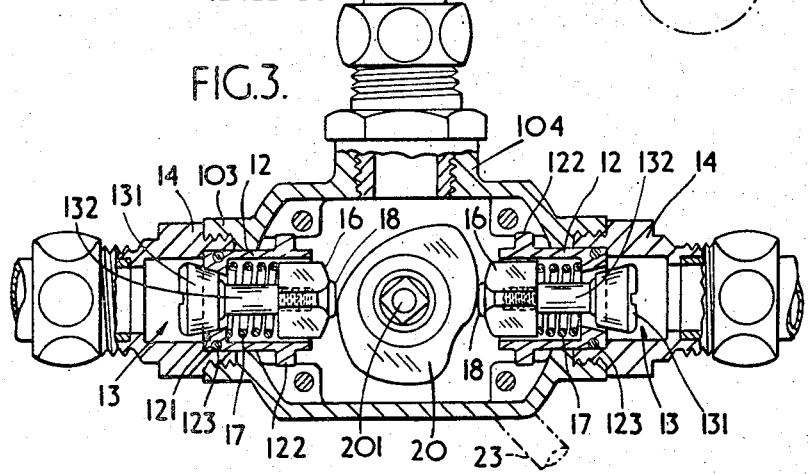
Figure 4:
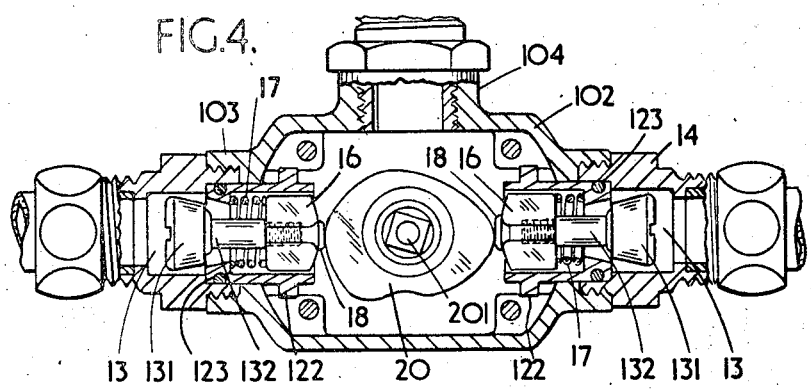
Figure 5:
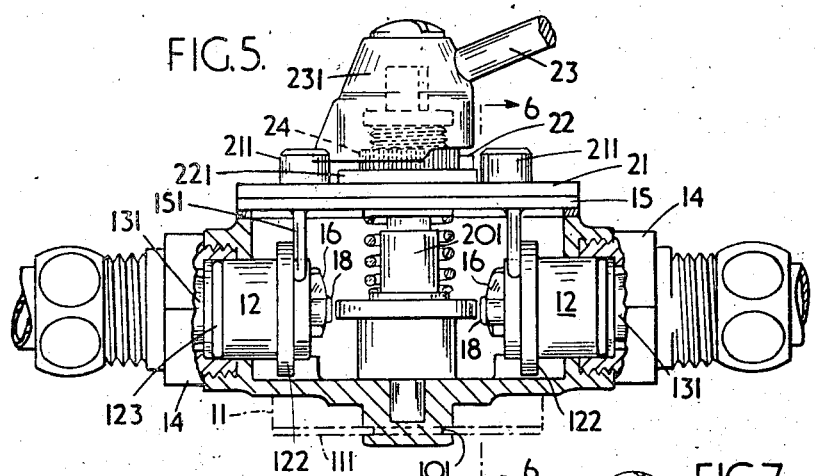
Figure 6:
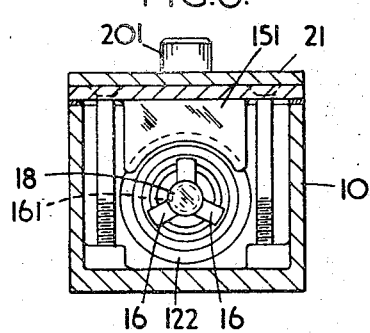
Figure 7:
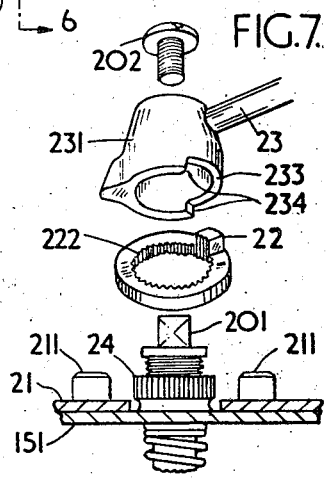

In the drawings:
FIGURE 1 is a front elevation of the mixing valve,
FIGURE 2 is a view partly in elevation but mainly in transverse section and on an enlarged scale of the mixing valve illustrated in FIGURE 1 showing the valves for controlling the hot and cold water inlets in the closed position,
FIGURE 3 is a similar view to FIGURE 2 but showing the cold water inlet control valve partly open and the hot water inlet control valve closed,
FIGURE 4 is a similar view to FIGURES 2 and 3 but with both cold and hot water inlet control valves open,
FIGURE 5 is a view at right angles to FIGURES 1 to 4 partly in elevation and partly in transverse section illustrating the manner of retaining separately formed housings for the inlet control valves in position within the main housing,
FIGURE 6 is a cross section taken on the plan indicated by the line 6—6 in FIGURE 5 looking in the direction of the arrows to the said line, and
FIGURE 7 is an exploded view in elevation illustrating the manner of adjusting the setting of the stop and handle relatively to the spindle carrying the cam for determining the maximum temperature at which mixed fluid can be dispensed.

In the drawings like numerals of reference indicate similar parts in the several views.

According to the illustrated embodiment of the invention the mixing valve incorporates a main housing 10 which is provided at the rear (see FIGURE 5) with a neck 101 adapted to be fitted in the upstanding fork 111 of a fixing bracket 11 sufficient only of which is indicated as is necessary to an understanding of the invention.

The main housing 10 is provided with oppositely disposed inlet sections 102 and 103 one of which namely that designated by the reference numeral 102 is adapted for connection to the cold water supply and the other namely that designated by the reference numeral 103 to the hot water supply.

The main housing 10 is also provided with an outlet section 104.

Fitted within each of the inlet sections 102, 103 is a separately formed valve housing 12 having at one end a seating 121 for a poppet valve 13 and adjacent to the other end an outwardly projecting flange 122.

The said valve housings 12 are clamped in position in the main housing 10 between tubular plugs 14 which screw into the respective inlet sections 102, 103 and saddles 151 which are carried by and which project inwardly from an inner cover plate 15 for one side of the main housing 10.

Each valve seating 121 is complementary to the resilient frusto-conical heads 131 of the poppet valve 13. Each poppet valve 13 incorporates an inwardly directed stem 132 which is screw-threaded at the inner end for the fitment thereon of a guide member 16 of trefoil shape in cross section (see FIGURE 6). The guide members 16 are capable of a guided rectilinear movement in their respective valve housings 12.

The valve housings 12 are also associated with O-rings 123 for ensuring water-tightness when the valve housings 12 are clamped within the main housing 10 as aforesaid.

Interposed between each valve head 131 and the trefoil guide member 16 screwed on the stem 132 thereof is a coil spring 17 which tends to draw the frusto-conical heads 131 of the poppet valves 13 on to the respective seatings 121.

The trefoil guide members 16 are each provided with a centrally disposed hole 161 within which is fixed an inwardly directed rubber plug 18 which serves as a tappet. These tappet plugs 18 are adapted to co-operate with the surface of a cam 20 which is mounted on the central portion of a spindle 201 which is turnable in bearings supported by the main housing 10. The cam 20 is given a profile such that as it is turned from the off position the poppet valve 13 controlling the cold water inlet 102 only is opened initially (see FIGURE 3). Subsequent turning of the cam 20 occasions the opening of the poppet valve 13 controlling the hot water supply inlet 103 (see FIGURE 4).

The profile of the cam 20 is such as to effect progressive openings and closings of the poppet valves 13 in a proportionate amount dependent upon the direction of rotation which is imparted to the said cam 20.

At one end the spindle 201 projects from the main housing through apertures in an outer cover plate 21 and in the inner cover plate 15 to which reference has already been made.

Adapted to be fixed to the outer projecting end of the spindle 201 (see FIGURE 7) by means of a screw 202 is a hub 231 with which is associated an actuating handle in the form of a lever 23. This lever 23 may be manipulated for turning the cam 20 for opening and closing the poppet valves 13 as may be required for obtaining the desired temperature of the water to be discharged from the outlet 104. The hub 231 of the handle 23 is provided with a projection 232 which co-operates with externally disposed stops 211 fixed to the outer cover plate 21 for limiting the movement permitted to the handle 23 according to the setting of the hub 231 on the spindle 201.

The skirt of the hub 231 is recessed as at 233 to provide shoulders 234 one or other of which according to the setting of the hub 231 on the spindle 201 co-operates with a settable stop 22 for determining the maximum opening movement of the hot water inlet valve so as to restrict the maximum temperature at which water may be discharged from the outlet 104 and thus serve as a safeguard against scalding should the lever 23 be actuated thoughtlessly or by immature individuals such as children.

As illustrated the settable stop 22 for determining the maximum temperature at which water may be discharged is carried by a ring 221 having a splined inner periphery 222 which is settable on a splined member 24 fixed on the actuating spindle 201 so that after removal of the hub 231 the splined ring 221 may be drawn off the splined member 24 and then reset in the position required.

The saddles 151 aforesaid which project inwardly from the inner cover plate as well as serving as a clamping abutment for the flanges 122 of the valve housings 12 also serve to ensure that the tappets 18 will register correctly with the profile of the cam 20.

If desired the main housing 10 may be formed with a pair of oppositely disposed outlets 104 and provision made for 'stopping off' the outlet which is not required to be used.

It will be appreciated that by turning the lever 23 away from the relevant stop 211 the user initially effects the opening of the cold water inlet control valve so that cold water only will flow from the outlet 104 of the main housing 10 and that as turning proceeds the cold water inlet control valve 13 is progressively closed and the hot water inlet control valve 13 is progressively opened in a proportionate amount until water is discharged from the outlet at the required temperature.

It will be understood that if it were possible to move the lever 23 to its maximum position for the admission of hot water regardless of the settable stop 22 the cold water would be completely cut off whilst the hot water flow would continue to flow but that in order to avoid scalding by thoughtlessness or usage by immature persons such as children the settable stop 22 which determines the extent of movement permitted to the actuating lever 23 toward the fully open hot water supply position is set so that the maximum temperature of water will not be dangerous in the event of thoughtlessness or usage by immature individuals.

It will be appreciated also that a fluid mixing valve as hereinbefore described permits of a fine adjustment of the discharge temperature and admits of a large flow of mixed fluid in proportion to the size of the inlets and of easy servicing.

It will be appreciated further that the pressure of the cold and hot water supply acting on the heads of the inlet control valves tends to maintain the relevant fluid inlet control valves on their respective seatings.

In conclusion it is to be appreciated that mixing valves in accordance with the invention are not confined to use with shower fittings but may be used with fittings for ablutionary purposes generally and that the mixing valves of the invention may be used for the mixing of fluids other than hot and cold water.

I claim:
1. A fluid mixing valve incorporating a main housing provided with an inlet for the hot fluid and with an oppositely disposed inlet for the cold fluid and with outlet means for the mixed fluids, separately formed valve housings which are removably mounted in said main housing, valve means for controlling the flow from said inlets, means for ensuring an axial guided movement of the valve means relatively to their respective valve housing, tappets for actuating said valve means, a turnable single profile cam adapted when turned to co-act with said tappets for effecting the progressive opening and closing of the inlet control valve means so that there shall be a proportionate mixing of hot and cold fluids as the cam is turned, means for turning the cam for achieving the said purpose and means for retaining the valve housings within the main housing which make sure that the housings are correctly positioned and retained within the main housing and thereby to ensure that the tappets for actuating the guided valve means will always be presented to the periphery of the cam.

2. A fluid mixing valve as claimed in claim 1 in which provision is made in conjunction with the actuating means for limiting the maximum temperature at which fluid may be dispensed.

3. A fluid mixing valve as claimed in claim 1 in which the inlet control valve means are in the form of poppet valves and in which the stem of each poppet valve has associated therewith a finned member which is capable of a guided motion within the respective separately formed valve housing and in which the gaps between the fins of the said finned members provide passages for the flow of fluid from the inlets into the interior of the main housing and thence to the outlet means when the valve means so permit.

4. A fluid mixing valve as claimed in claim 1 in which the means for determining the maximum temperature at which fluid may be dispensed is in the form of a projecting stop member which is carried by a ring having a splined inner periphery which can be set adjustably on a complementary splined part fixed to the spindle on which the actuating means is mounted and in which the actuating means is provided with a projection which can abut the said stop and consequently prevent further movement of the actuating means and thereby determine the maximum temperature at which fluid may be dispensed.

5. A fluid mixing valve as claimed in claim 1 in which the heads of the valves are resilient and in which spring means is provided which tends to draw the heads of the said valves on to their seatings in their respective housings.

References Cited

UNITED STATES PATENTS

| | | | |
|---|---|---|---|
| 928,732 | 7/1909 | Benwitz | 137—636.2 X |
| 1,128,302 | 2/1915 | Fausek | 137—636.1 |
| 1,822,346 | 9/1931 | Guiles | 137—636.1 X |
| 2,075,600 | 3/1937 | Baker | 137—636.1 |
| 2,236,182 | 3/1941 | Meersmans | 137—636.3 |
| 2,895,710 | 7/1959 | Sanctuary | 251—170 X |
| 2,935,293 | 5/1960 | Monson | 251—288 X |
| 3,021,724 | 2/1962 | Seger | 137—636.1 X |

FOREIGN PATENTS

| | | |
|---|---|---|
| 19,570 | 9/1914 | Great Britain. |
| 566,017 | 11/1923 | France. |

CLARENCE R. GORDON, *Primary Examiner.*